United States Patent
Adcock et al.

(10) Patent No.: US 12,101,199 B1
(45) Date of Patent: Sep. 24, 2024

(54) CONFERENCE SYSTEM FOR USE OF MULTIPLE DEVICES

(71) Applicant: Capital One Services, LLC, McLean, VA (US)

(72) Inventors: Lee Adcock, Midlothian, VA (US); Mehulkumar Jayantilal Garnara, Glen Allen, VA (US); Vamsi Kavuri, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/224,775

(22) Filed: Jul. 21, 2023

(51) Int. Cl.
*H04L 12/18* (2006.01)

(52) U.S. Cl.
CPC .............................. *H04L 12/1822* (2013.01)

(58) Field of Classification Search
None
See application file for complete search history.

(56) References Cited

U.S. PATENT DOCUMENTS

| | | | |
|---|---|---|---|
| 8,593,501 B1 * | 11/2013 | Kjeldaas | H04L 12/1818 704/235 |
| 10,562,159 B2 | 3/2020 | Thakkar et al. | |
| 10,645,341 B1 * | 5/2020 | Noland | H04N 7/147 |
| 10,848,712 B1 * | 11/2020 | Rao | H04N 21/4307 |
| 10,979,481 B2 | 4/2021 | Jayaweera | |
| 11,228,624 B1 * | 1/2022 | Oueslati | H04L 65/1069 |
| 11,722,328 B2 * | 8/2023 | Frolovichev | H04M 3/563 709/206 |
| 11,777,754 B1 * | 10/2023 | Zhang | G06V 20/46 709/204 |
| 2003/0056220 A1 * | 3/2003 | Thornton | H04L 65/1101 725/62 |
| 2005/0078172 A1 * | 4/2005 | Harville | H04N 7/142 348/14.09 |
| 2012/0127263 A1 * | 5/2012 | Ogle | H04N 7/152 348/14.09 |
| 2013/0176382 A1 | 7/2013 | Fujino | |
| 2013/0342637 A1 * | 12/2013 | Felkai | H04L 69/24 348/E7.083 |
| 2014/0168345 A1 * | 6/2014 | Vernick | H04N 7/15 348/14.02 |
| 2016/0150184 A1 * | 5/2016 | Gandhi | H04N 7/15 348/14.08 |
| 2016/0227161 A1 | 8/2016 | Jing et al. | |
| 2017/0171261 A1 * | 6/2017 | Smus | G06V 40/197 |
| 2020/0110572 A1 * | 4/2020 | Lenke | G06F 3/167 |
| 2020/0344278 A1 * | 10/2020 | Mackell | G10L 17/00 |

(Continued)

FOREIGN PATENT DOCUMENTS

| | | | | |
|---|---|---|---|---|
| KR | 20140030276 A | * | 5/2012 | |
| WO | 2014143060 A1 | | 9/2014 | |
| WO | WO-2014180371 A1 | * | 11/2014 | ......... H04L 12/1822 |

*Primary Examiner* — Phyllis A Book
(74) *Attorney, Agent, or Firm* — Sterne, Kessler, Goldstein & Fox P.L.L.C.

(57) ABSTRACT

A conference system is described that associates a first device and a second device to the same user, compares a first input from the first device and a second input from the second device, and modifies a setting of a conference session. The first input and the second input may be a video input or an audio input. The modification may include, for example, noise removal, determination of the user's AV feed device, or removing a background image.

20 Claims, 11 Drawing Sheets

(56) References Cited

U.S. PATENT DOCUMENTS

2021/0136127 A1\* 5/2021 Ghanaie-Sichanie ........................ H04L 65/1069
2021/0399911 A1\* 12/2021 Jorasch ............... H04L 12/1822
2021/0400142 A1\* 12/2021 Jorasch ................. H04N 7/147

\* cited by examiner

CONFERENCE SYSTEM FOR USE OF MULTIPLE DEVICES

BACKGROUND

Improving the operability of online conferencing systems is becoming increasingly important as the demand for remote work increases. In particular, conference settings such as background noise reduction and background processing can improve user convenience and privacy protection. In addition, it is common these days for one user to own multiple terminals, and for users log in to meetings at the terminal of their choice.

BRIEF DESCRIPTION OF THE DRAWINGS/FIGURES

Embodiments of the present disclosure are described with reference to the accompanying drawings. In the drawings, like reference numbers indicate identical or functionally similar elements. Additionally, the leftmost digit(s) of a reference number identifies the drawing in which the reference number first appears. In the accompanying drawings.

Figure 1:
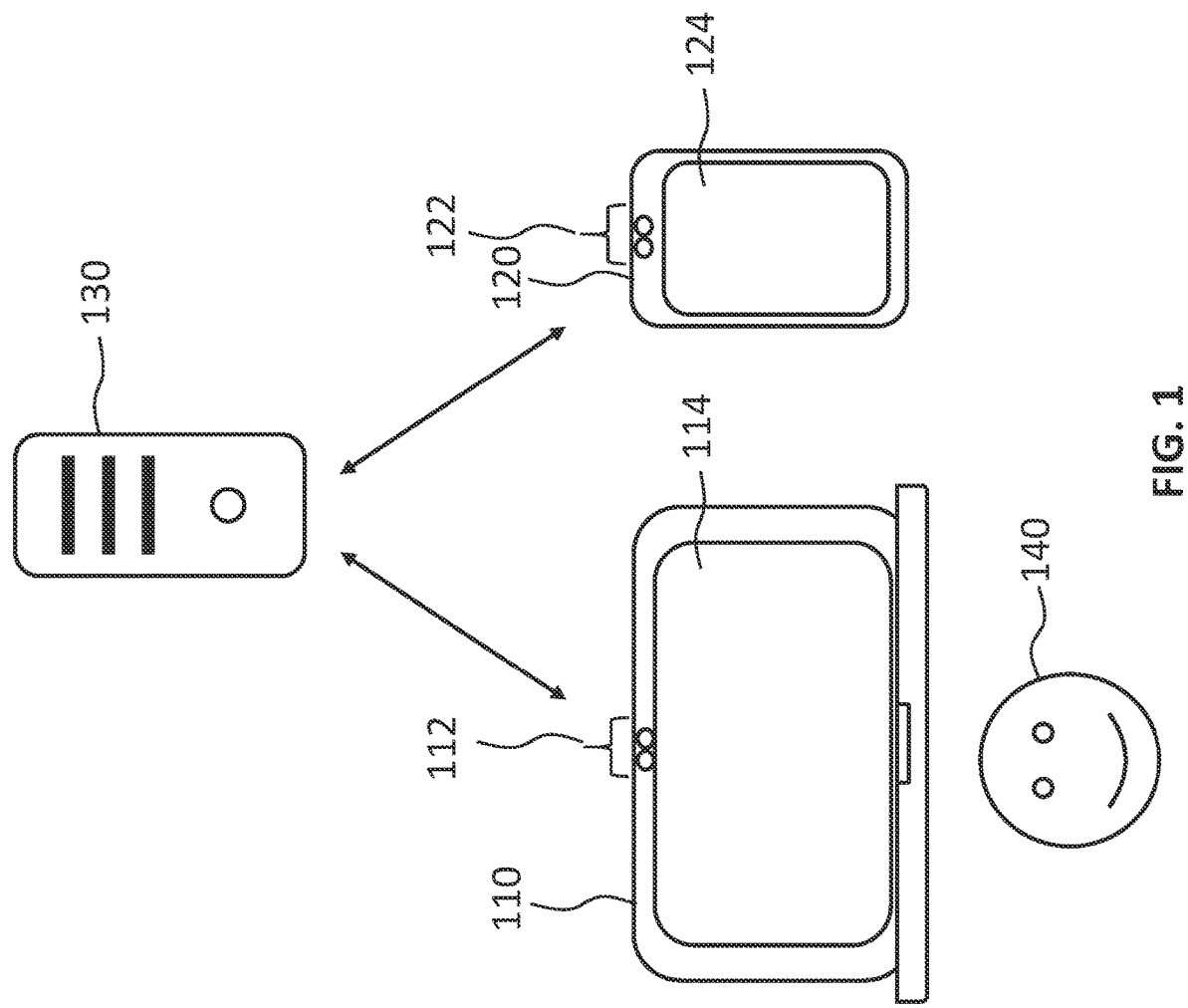
FIG. 1 illustrates an example of a conference system in an embodiment of the present disclosure.

Embodiments of the present disclosure will now be described with reference to the accompanying drawings.

DETAILED DESCRIPTION

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module," "engine," or "unit" referred to herein may include software, hardware, or a combination thereof in an embodiment of the present disclosure in accordance with the context in which the term is used. For example, the software may be machine code, firmware, embedded code, or application software. The software may include instructions stored on a non-transitory storage medium that, when executed by hardware, cause the hardware to perform functions in accordance with those instructions. The hardware may be, for example, circuitry, a processor, a special purpose computer, an integrated circuit, integrated circuit cores, a pressure sensor, an inertial sensor, a microelectromechanical system (MEMS), passive devices, or a combination thereof. Further, if a module, engine, or unit is written in the system or apparatus claims section below, the module, engine, or unit is deemed to include hardware circuitry for the purposes and the scope of the system or apparatus claims.

The modules, engines, or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 illustrates an example of a conference system in an embodiment of the present disclosure. System 100 includes a first device 110, a second device 120, and a conference server 130. A user 140 owns the first device 110 and the second device 120. The first device 120 is, for example, a laptop computer having an audio/video (AV) input device 112 and a screen 114. The second device 120 is, for example, a tablet computer having an AV input device 122 and a screen 124. AV input devices 112 and 122 are, for example, cameras and microphones. The microphone may be a directional microphone capable of detecting the direction of sound arrival. In this disclosure, "AV" may refer to both audio and video, or only one of them. The first device 110 transmits an input signal captured by the AV input device 112, as a first input to the conference server 130. The second device 120 transmits an input signal captured by the AV input device 122 as a second input to the conference server 130. The laptop computer and the tablet computer are merely examples of the first device 110 and the second device 120, respectively. The first and second electronic devices can be any electronic device that can be connected to the conference server 130. The first and second electronic devices may be, for example, smartphones, desktop computers, dedicated conference terminals, etc.

Figure 2:
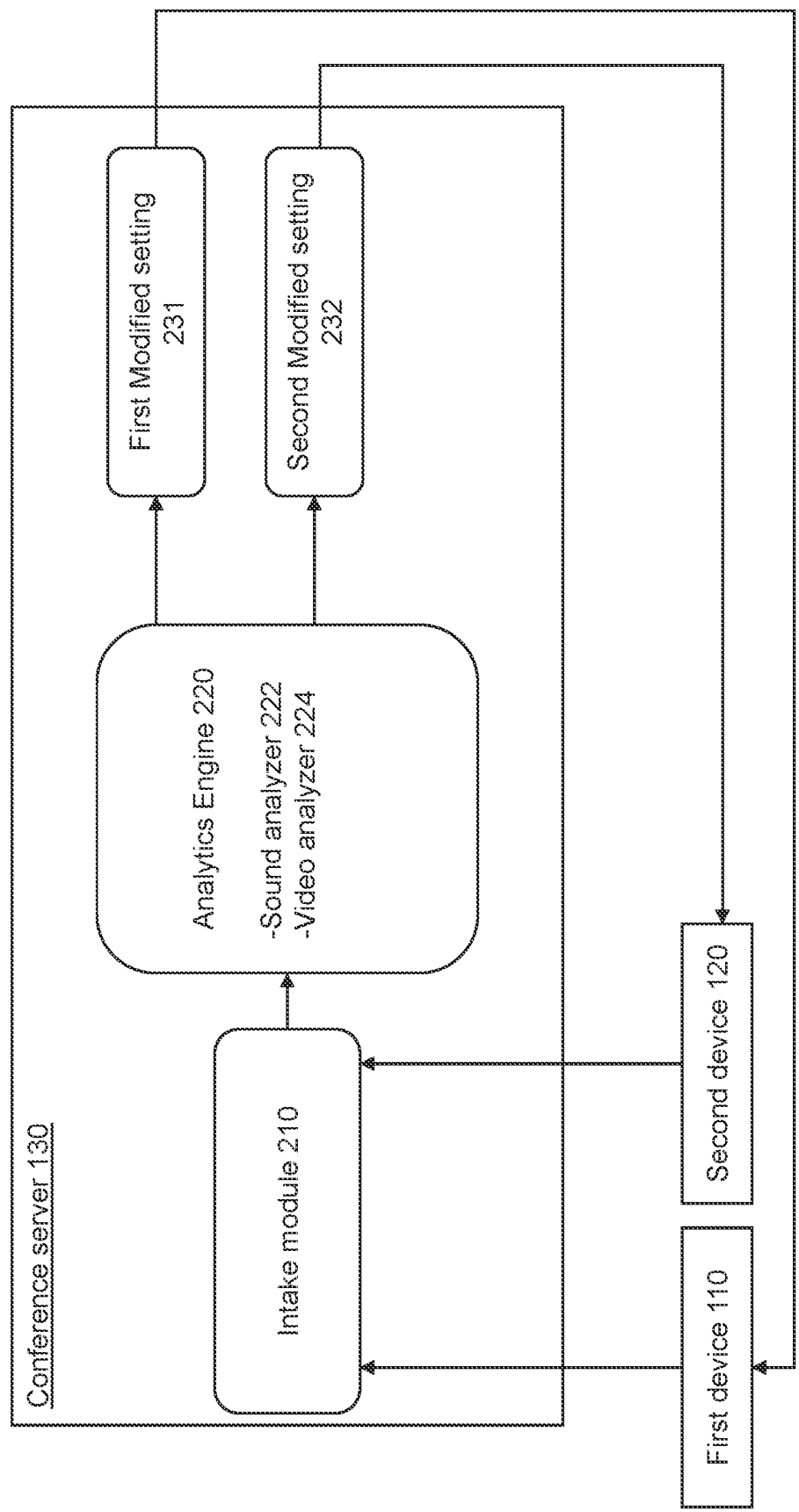
FIG. 2 illustrates a block diagram of an example of a conference system in an embodiment of the present disclosure.

FIG. 2 illustrates a block diagram of an example of the conference system in an embodiment of the present disclosure. In one embodiment, the conference server 130 may be part of a backend computing infrastructure, including a server infrastructure of a company or institution. In some embodiments, the backend computing infrastructure may be implemented in a cloud computing environment. The cloud computing environment may be a public or private cloud service. A private cloud refers to a cloud infrastructure similar to a public cloud with the exception that it is operated solely for a single organization.

In some embodiments, the conference server 130 may be implemented with modules and sub-modules. For example, the conference server 130 may include an intake module 210, and an analytics engine 220. In some embodiments, the intake module 210 may be coupled to the analytics engine 220. The conference server 130 handles a conference session in which devices including the first device 110 and the second device 120 participate.

The intake module 210 enables the receipt of one or more AV inputs, including a first input and a second input, from one or more remote devices including the first device 110 and the second device 120.

The analytics engine 220 enables the parsing and analysis of the AV inputs. In some embodiments, the analytics engine 220 includes a sound analyzer 222 and a video analyzer 224. The sound analyzer 222 performs the audio-related analysis of the processing performed by the conference server 130, which is described below. The video analyzer 224 performs the video-related analysis of the processing performed by the conference server 130, which is described below. In some embodiments, the analytics engine 220 may be implemented with, or as a part of, a cloud computing service.

Based on the analytics, the analytics engine 220 generates a first modified setting 231 and a second modified setting 232. The conference server 130 then sends the first modified setting 231 and the second modified setting 232 to the first device 110 and the second device 120, respectively. The first modified setting 231 and the second modified setting 232, alone or in combination, modify the settings of the conference session.

Overview Operations of the Conference System

Figure 3:
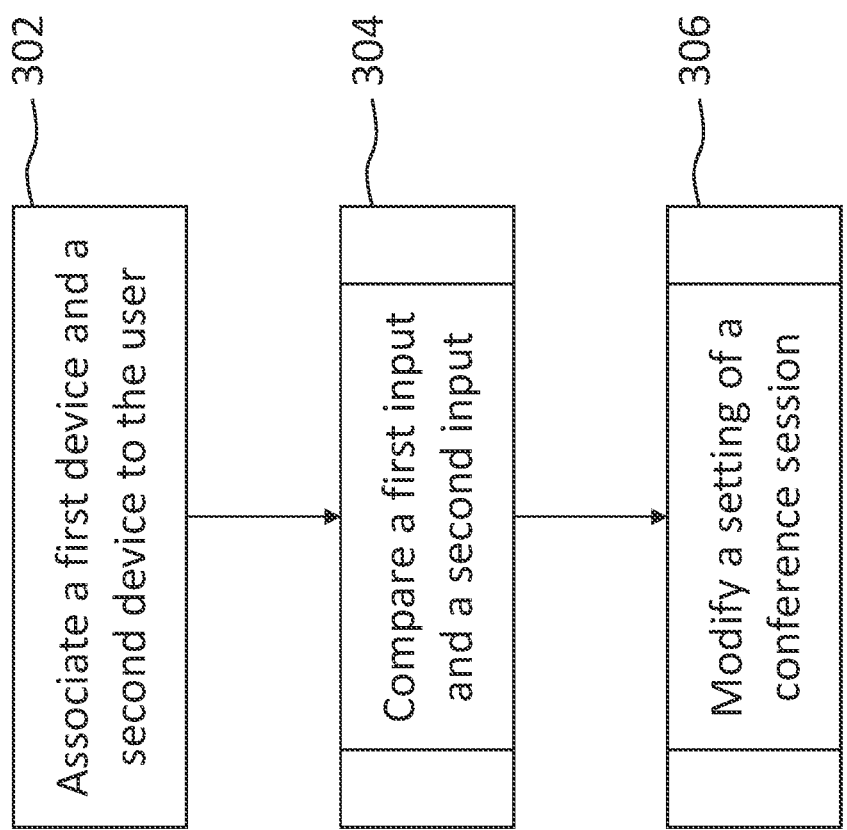
FIG. 3 illustrates a flowchart that describes an example of an overview operation of a conference system.

FIG. 3 illustrates a flowchart that describes an example of an overview operation of the conference system. In some embodiments, the operations described below are performed by functional elements of the conference server 130, such as the intake module 210, analytics engine 220, sound analyzer 222, and video analyzer 224, in cooperation with hardware elements such as a processor and memory. Henceforth, when the subject of the description of the operation is simply stated as the conference server 130, it means that one or more of the above-mentioned elements performs the operation.

At operation 302, a first device and a second device are associated with a user. In an example, the conference server 130 associates the first device 110 and the second device 120 to the user 140. The user 140 attempts to participate in a conference session indicated in an invitation or in a conference session the user 140 organizes, using both the first device 110 and the second device 120 that the user 140 owns. Specifically, the user 140 can log in using two or more devices owned by the user 140, for example, by logging in to the same conference session ID using the same user ID. Upon detecting such a dual login of a user 140, the conference server 130 assumes that the second terminal used for login is being used by the same user as the first terminal, and associates the respective terminal with the same user. If the conference server 130 associates multiple terminals with the same user, it may display the conference session as if the user were logged into the conference session on a single terminal. The conference server 130 receives AV input from the first and second devices 110 and 120, respectively, but may set up the conference session as if only certain AV inputs are the AV feed for the conference session of the user 140. Audio input from one device and video input from a different device may be configured as the user 140's AV feed. In this disclosure, AV feed means the AV input actually used for the user's microphone audio or camera video in the conference session.

At operation 304, the input from the first device is compared to the input from the second device. In an example, the conference server 130 compares the first input and the second input. As already explained, the first input is the AV input from the first device 110, and the second input is the AV input from the second device 120. Since operation 304 is an operation with several variations in this disclosure, individual variations are further discussed below.

At operation 306, a setting of the conference section is modified based on the results of the comparison made in operation 304. In an example, the conference server 130 modifies a setting of the conference session. Examples of various conference settings that may be modified are discussed in further detail below. Based on the results of the comparison made in operation 304, the conference server 130 determines optimal conference settings and applies the conference settings to the conference session. Since operation 306 is an operation with several variations in this disclosure, individual variations are discussed below.

Comparison of Audio Inputs

Figure 4:
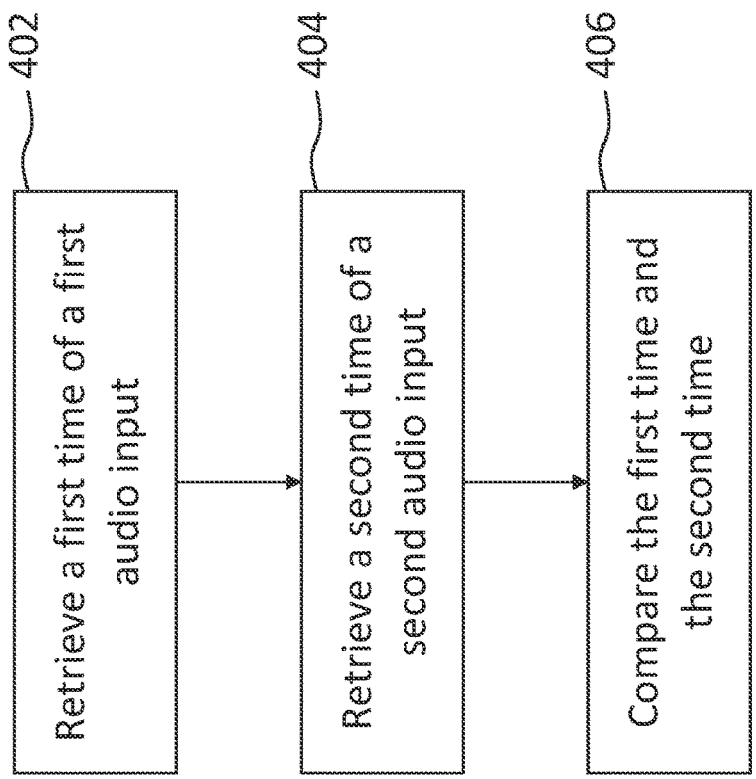
FIG. 4 illustrates an example of operation 304 of FIG. 3 in an embodiment of the present disclosure.

FIG. 4 illustrates an example of operation 304 of FIG. 3 in an embodiment of the present disclosure. As mentioned above, operation 304 is an operation that includes comparing the audio input and/or the video input among the elements that comprise the first and second inputs, but in the following, an example of comparing the audio input is described in particular. Thereafter, the audio input of the first/second input is referred to as the first/second audio input and the video input is referred to as the first/second video input. In some embodiments, the conference server 130 may perform the operations described in FIG. 4 simultaneously with the operations described in FIG. 7 or FIG. 9.

At operation 402, a first time of the first audio input is retrieved. In an example, the conference server 130 retrieves a first time of the first audio input. The first time is the time related to the time when the sound is detected on the first device. The first time may be obtained by using a timestamp obtained on the first device 110 side, a timestamp obtained on the conference server 130, or any other value defined in existing audio streaming standards, etc. The representation format of the first time may be absolute time or relative to the second time, etc., as described below. The time may be retrieved periodically over a short period of time, or it may be done for each sound source using known sound source identification methods. The time may be retrieved for each speaker using a known speaker identification method.

At operation 404, a second time of the second audio input is retrieved. In an example, the conference server 130 retrieves a second time of the second audio input. The second time is the time related to the time when the sound is detected on the second device. The second time may be obtained by using a timestamp obtained on the second device 110 side, a timestamp obtained on the conference server 130, or any other value defined in existing audio streaming standards, etc. The representation format of the second time may be absolute time or relative to the first time, etc.

At operation 406, the first time is compared to the second time. In an example, the conference server 130 compares the first time and the second time. The result of the comparison may be expressed as a specific time difference or as information indicating which input occurred relatively earlier.

Modification—Removal of a Background Noise

Figure 5:
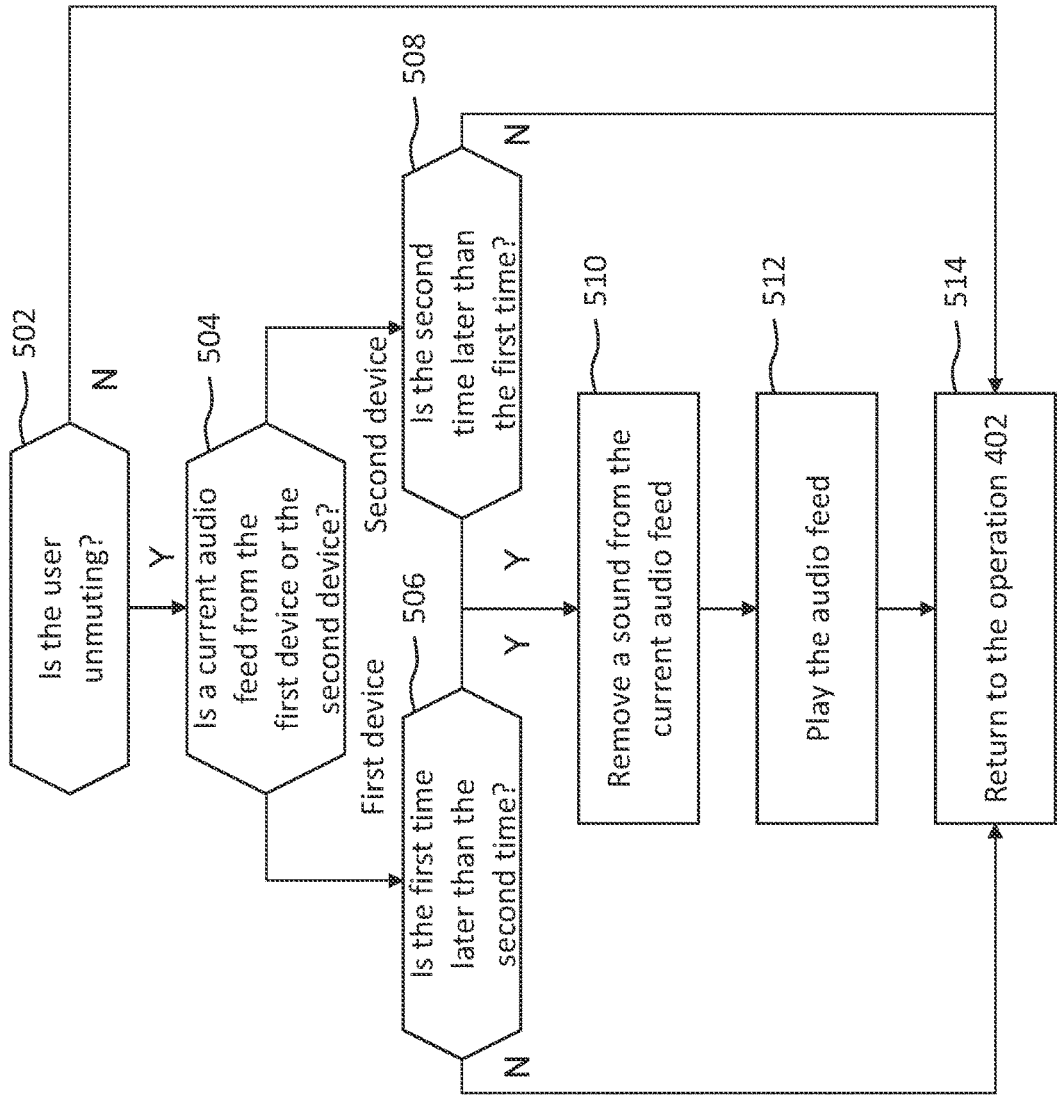
FIG. 5 illustrates an example of operation 306 of FIG. 3 in an embodiment of the present disclosure.

FIG. 5 illustrates an example of operation 306 of FIG. 3 in an embodiment of the present disclosure. In some embodiments, operations described in FIG. 5 assume that operations described in FIG. 4 were performed in operation 304. By performing the operations described in FIG. 5, background noise in the user 140's environment is more efficiently removed from the conference session. In some embodiments, the conference server 130 may perform the operations described in FIG. 10 simultaneously with the operations described in FIG. 6, FIG. 8, and FIG. 10.

At operation 502, it is determined whether the user is unmuting their audio feed. In an example, the conference server 130 determines whether the user 140 is unmuting the user 140's audio feed to the conference server. If a user 140 does not speak in a conference session, the user 140 often mutes themselves. In such cases, there is little need to remove background noise and the operation moves to operation 514 and returns to operation 402. This operation is optional, as there are cases where background noise removal may nonetheless be desired in the system's internal processing.

At operation 504, it is determined whether a current audio feed is being received from the first device or the second device. In an example, the conference server 130 determines whether the user 140's audio feed is from the first device 110 or the second device 120. In other words, the conference system 130 may determine which device the user 140 is using for voice input.

At operation 506, in the case where the audio feed is from the first device, it is determined whether the first time is later than the second time. In an example, the conference server 130 determines whether the first time is later than the second time. The first time being later than the second time indicates that the sound in question originated from a sound source located closer to the second device than the first device. For example, in the example shown in FIG. 1, user 140 is located in front of device 110, so the first time, the time at which user 140's voice is detected by device 110, should be earlier than the second time, the time at which user 140's voice is detected by device 120. On the other hand, background noise, which is a sound other than the voice of the user 140, is more likely to occur near the device 120, in which case the first time of that specific noise would be later than the second time. A similar process may also be performed in operation 508 (when the current audio feed is determined in operation 504 to be from the second device). In operation 508, because the current audio feed is from the second device, it is determined whether the second time is later than the first time.

At operation 510, a sound from the current audio feed that is detected as late is removed from the audio feed. In an example, the conference server 130 removes a sound that is detected late in the device designated as the source of the audio feed (that is, a sound in the current audio feed that arrives later than the same sound from the other device) from the audio feed. As explained above, the sound which is detected late in the device designated as the source of the audio feed is likely to be the background noise. Therefore, excluding such sounds can improve the sound quality of the conference session.

At operation 512, after removing the specific sound from the audio feed at operation 510, the audio feed is played. In an example, the conference server 130 plays the audio feed at the conference session.

At operation 514, the operation returns to operation 402 for re-execution of the entire step 304. In this way, noise removal can be performed using the detection time of the sound source based on the assumption that the user's voice is generated close to the device that is the source of the audio feed and background noise is generated close to other devices.

If the first device 110 and the second device 120 use microphones capable of detecting the direction of arrival of the recorded sound as the AV input devices 112,122, triangulation of the sound source location can be performed by combining the first and second times with the direction of arrival of the sound. Triangulation of the location of the sound source allows for determining a relative or absolute location of the sound source. Therefore, it is also possible to remove from the audio feed sounds generated from sound sources that are more than a predetermined distance by using triangulation.

Modification—Determination of the Video Feed

Figure 6:
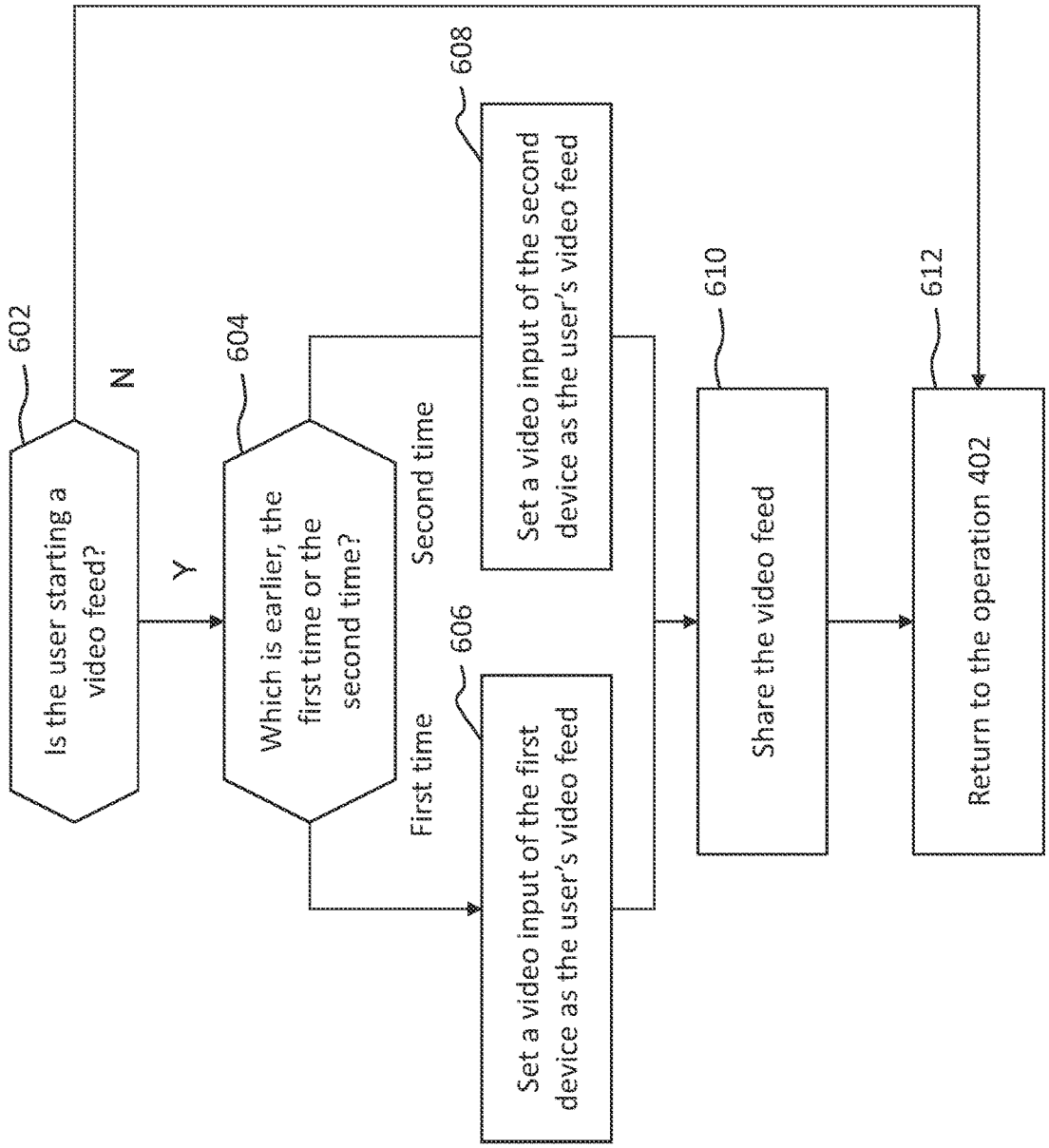
FIG. 6 illustrates an example of operation 306 of FIG. 3 in an embodiment of the present disclosure.

FIG. 6 illustrates an example of the operation 306 of FIG. 3 in an embodiment of the present disclosure. In some embodiments, operations described in FIG. 6 assume that operations described in FIG. 4 were performed in operation 304. By performing the operations described in FIG. 6, an appropriate video feed may be determined from the first video input and the second video input. In some embodiments, the conference server 130 may perform the operations described in FIG. 6 simultaneously with the operations described in FIG. 5, FIG. 8, and FIG. 10.

At operation 602, it is determined whether the user is starting a video feed. In an example, the conference server 130 determines whether the user 140 is starting the user 140's video feed to the conference server 130. Although this operation is optional, a determination of the device feeding the video or audio feed may be desired in the system's internal processing. If user 140 has not started the video, the operation may proceed to operation 612, and the operation returns to operation 402.

At operation 604, it is determined whether a detected audio input is received by the first device earlier or later than when the same audio input is received by the second device. In an example, the conference server 130 determines whether the first or second time is earlier based on a result of the comparison performed in operation 406. This determination may be made for all sounds, for sounds with the highest sound energy or sound energy above a certain value, or only for sounds determined to be human voices using known voice identification techniques.

At operation 606 and operation 608, the video input of the appropriate device is set as the user's video feed. In an example, the conference server 130 sets the video input from the device which detects the sounds earlier as the video feed of the user 140 for the conference session. If the first time (corresponding to the audio input from the first device) is determined in operation 604 to be received earlier than the second time, then operation 606 is performed. If the second time (corresponding to the audio input from the second device) is determined in operation 604 to be received earlier than the first time, then operation 608 is performed. According to the example shown in FIG. 1, since the user 104 is located near the first device 110, the face of the user 104 is likely to be better captured by the AV input device 112 of the first device 110 or what the user 104 wants to share is on the screen 114 of the first device. Accordingly, in the example of FIG. 1, the audio input of the first device would likely be detected before the audio input of the second device in operation 604, and so the video input of the first device would be set as the user 140's video feed in operation 606.

At operation 610, the selected video feed is shared. In an example, the conference server 130 shares the video feed set at either operation 606 or operation 608.

At operation 612, the operation returns to operation 402 for re-execution of the entire step 304. In this way, the video feed can be set to the camera or display screen that the user 140 is most likely to be in close proximity to.

Comparison of the Video Inputs—Depth

Figure 7:
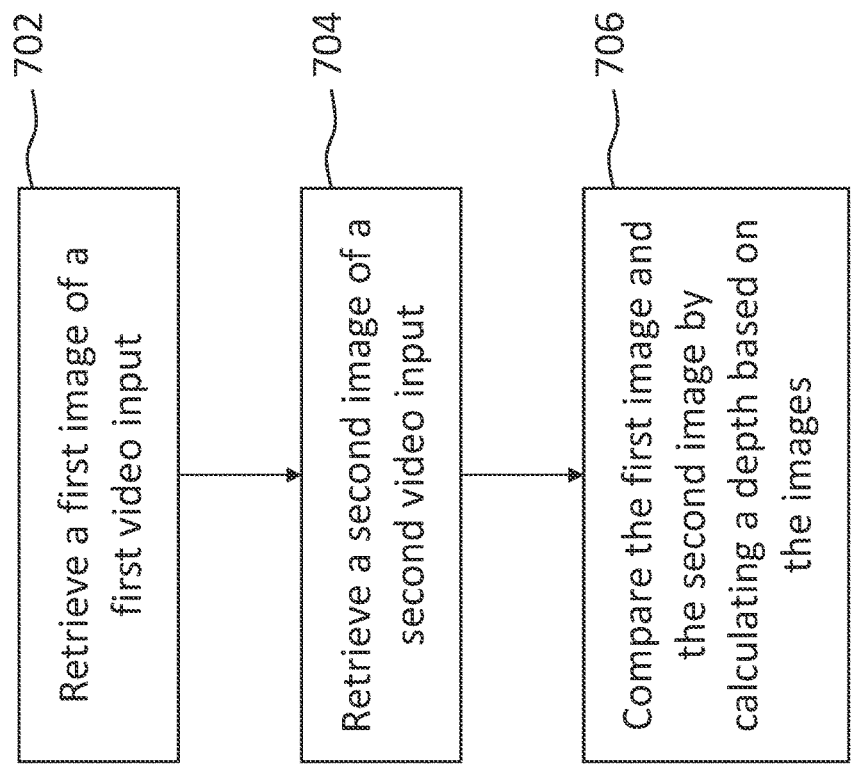
FIG. 7 illustrates an example of operation 304 of FIG. 3 in an embodiment of the present disclosure.

FIG. 7 illustrates an example of the operation 304 of FIG. 3 in an embodiment of the present disclosure. As mentioned above, operation 304 is an operation that includes comparing the audio input and/or the video input among the elements that comprise the first and second inputs, but in the following, an example of comparing the video input is described in particular. FIG. 7 illustrates how the conference server 130 compares the first and second video inputs to detect the depth of objects that are common to both the first and second video inputs. In some embodiments, the conference server 130 may perform operations described in FIG. 7 simultaneously with the operations described in FIG. 4 or FIG. 9.

At operation 702, a first image of a first video input is retrieved. In an example, the conference server 130 retrieves a first image of the first video input. In some embodiments, even though the user 140 does not explicitly initiate a video feed (e.g., the view of the user that is displayed to others via the conference system) for the conference session, the conference server 130 may receive video input from the first device 110 and the second device 120 respectively during the conference session. In this disclosure, a video feed means an AV input actually associated with the user in the conference session, such as the view of the user's face that is displayed through the conference system on the screen of other users' devices. Therefore, even if the conference server 130 receives video input from the user's device (e.g., from a webcam of device 110 and/or 120), the user 140 may not have requested to share an actual video feed. As already explained, the first video input is the video input from the first device 110. The first image is an image included in the first video input. The first image may be one picture, multiple pictures, a movie for a given period of time, or the like.

At operation 704, a second image of a second video input is retrieved. In an example, the conference server 130 retrieves a second image of the second video input. As already explained, the second video input is the video input from the second device 110. The second image is the image included in the second video input. The second image may be one picture, multiple pictures, a movie for a given period of time, or the like.

At operation 706, the first image and the second image are compared by calculating a depth of objects that are common to both the first and second images. In an example, the conference server 130 compares the first image and the second image by calculating a depth based on the first image and the second image. The depth of an image can be estimated based on the displacement of images obtained from two cameras at a predetermined distance apart. To calculate absolute depth, a distance between the camera of the AV input device 112 and the camera of the AV input device 122 may be known by user input or distance sensors, but this is not essential for calculating relative depth. The results of the comparison may be stored as absolute or relative depth to each pixel of the first and/or second video input.

Modification—Processing of a Background Image

Figure 8:
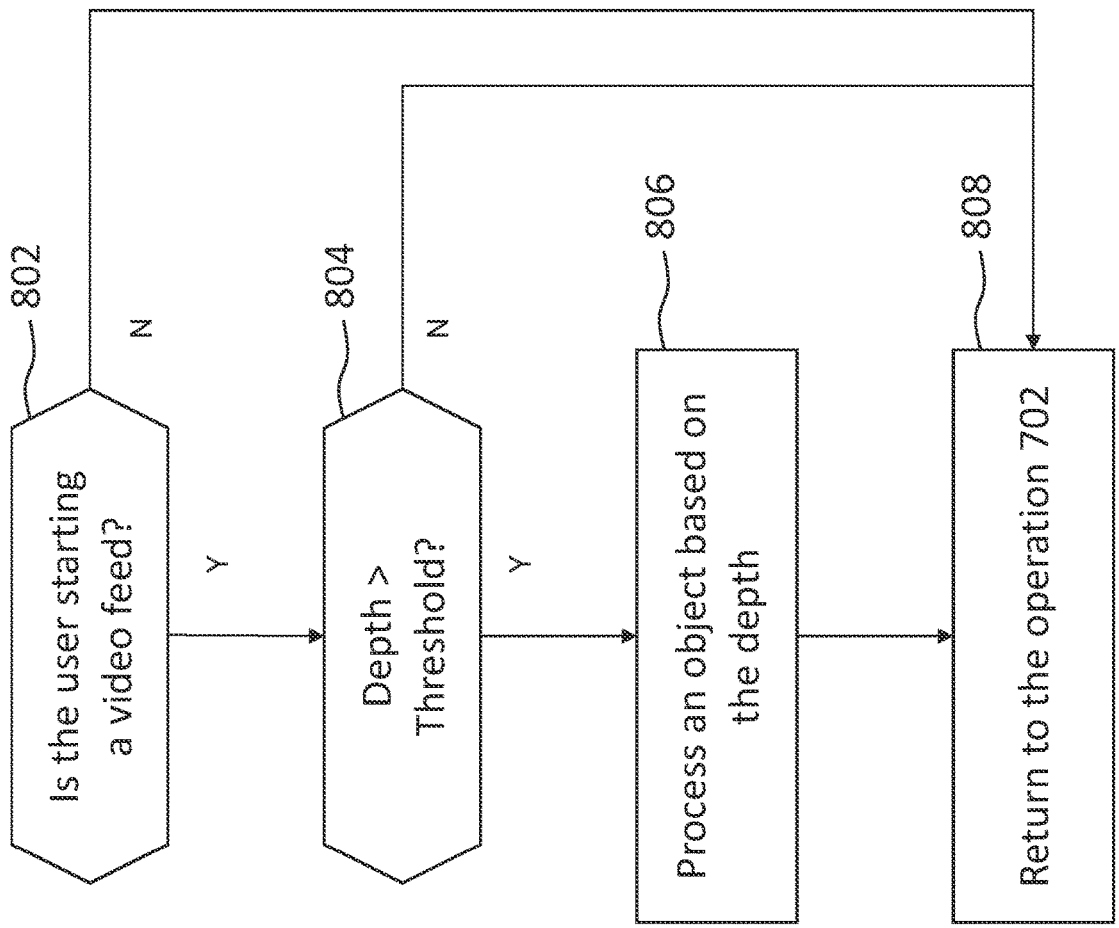
FIG. 8 illustrates an example of operation 306 of FIG. 3 in an embodiment of the present disclosure.

FIG. 8 illustrates an example of the operation 306 of FIG. 3 in an embodiment of the present disclosure. In some embodiments, the conference setting modified in operation 306 may be to blur, fill, or replace objects in an image's field of view that do not specifically correspond to a user or other item of interest, such as a background of the user. In some embodiments, operations described in FIG. 8 assume that the operations described in FIG. 7 were performed in operation 304. The process described in FIG. 8 allows the conference server 130 to process the user 140's background image and protect the user 140's privacy. In some embodiments, the conference server 130 may perform operations described in FIG. 8 simultaneously with the operations described in FIG. 5, FIG. 6, and FIG. 10.

At operation 802, it is determined whether the user is starting a video feed. In an example, the conference server 130 determines whether the user 140 is starting the user 140's video feed to the conference server 130, such that the user's image can be shared with other users through the conference system. Although this operation is optional, a determination of the background image may be desired in the system's internal processing. If user 140 has not started the video, the operation may proceed to operation 808 and the operation returns to operation 702 for re-execution of the entire step 304.

At operation 804, it is determined whether the depth from operation 706 is greater than a threshold. In an example, the conference server 130 determines whether the depth calculated at operation 706 is deeper than a predetermined threshold. This calculation may be done per pixel or per unit larger than a pixel, block, or object detected in any known way. If any depth is not deeper than the threshold, the operation moves to operation 808 and returns to operation 702 for re-execution of the entire step 304.

At operation 806, if the depth is deeper than the threshold, the object is processed based on the depth. In an example, the conference server 130 processes the object in the video feed based on the depth. This process may be done for pixels whose depth is deeper than the threshold or for the entire object where the depth of a given percentage of pixels in the object is deeper than the threshold. The processing may include, for example and without limitation, blurring, filling, and replacement. Thus, according to the example shown in FIG. 1, the face of user 140, which is relatively close to the AV input device 112 and the AV input device 122, may not be processed and remains the video feed of the conference session, but the background of user 140 may be blurred or otherwise processed.

At operation 808, the operation returns to operation 702 for re-execution of the entire step 304. In this way, the background image can be processed by determining that the object is at or above a predetermined distance by using two devices owned by the user 140.

Comparison of the Video Inputs—Line of Sight

Figure 9:
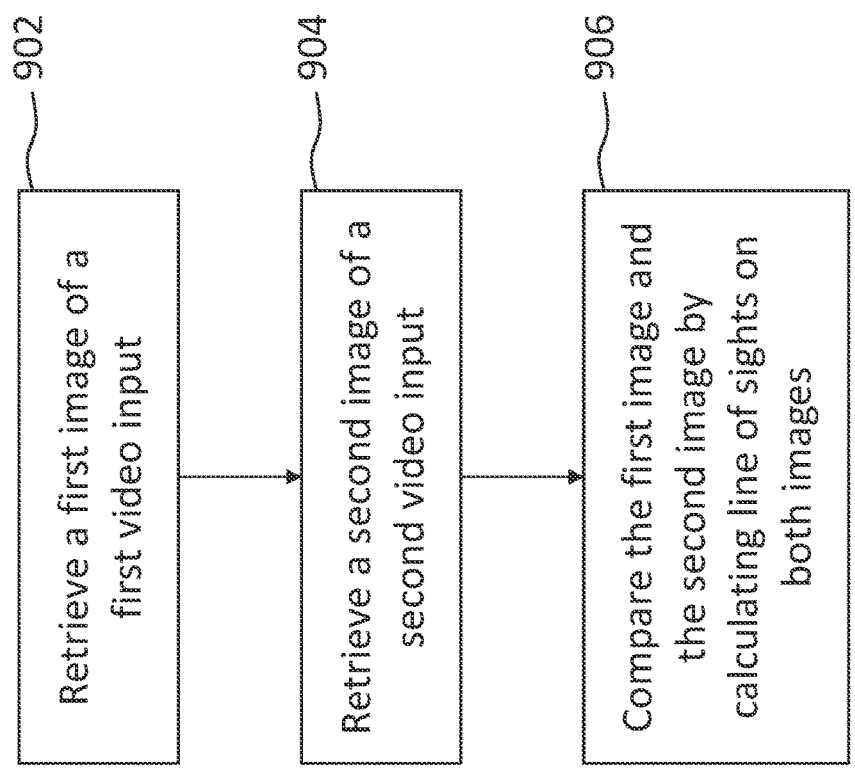
FIG. 9 illustrates an example of operation 304 of FIG. 3 in an embodiment of the present disclosure.

FIG. 9 illustrates an example of the operation 304 of FIG. 3 in an embodiment of the present disclosure. As mentioned above, operation 304 is an operation that includes comparing the audio input and/or the video input among the elements that comprise the first and second inputs, but in the following, an example of comparing the video input is described in particular. In some embodiments, the conference server 130 may perform the operations described in FIG. 9 simultaneously with the operations described in FIG. 4 or FIG. 7.

At operation 902, a first image of a first video input is retrieved. In an example, the conference server 130 retrieves a first image of the first video input. As already explained, the first video input is the video input from the first device 110. The first image is an image included in the first video input. The first image may be one picture, multiple pictures, a movie for a given period of time, or the like.

At operation 904, a second image of a second video input is retrieved. In an example, the conference server 130 retrieves a second image of the second video input. As already explained, the second video input is the video input from the second device 110. The second image is an image included in the second video input. The second image may be one picture, multiple pictures, a movie for a given period of time, or the like.

At operation 906, the first image is compared to the second image by calculating line of sights on both images. In an example, the conference server 130 compares the first image and the second image by calculating line of sight of the first image and the second image. As in the example shown in FIG. 1, if the user 140's face is captured in the AV input devices 112 and 122, the image of the user 140's eyes may be captured in the first and second images. The direction of a line of sight can be calculated from the feature points in the eye image. For example, if the AV input devices 112 and 122 have IR emitters, the IR reflected light from the user 140's eye may be used to detect line of sight. The results of the comparison may be stored as the direction of the line of sight to the AV input devices 112 and 122.

Modification—Determination of the Video Feed

Figure 10:
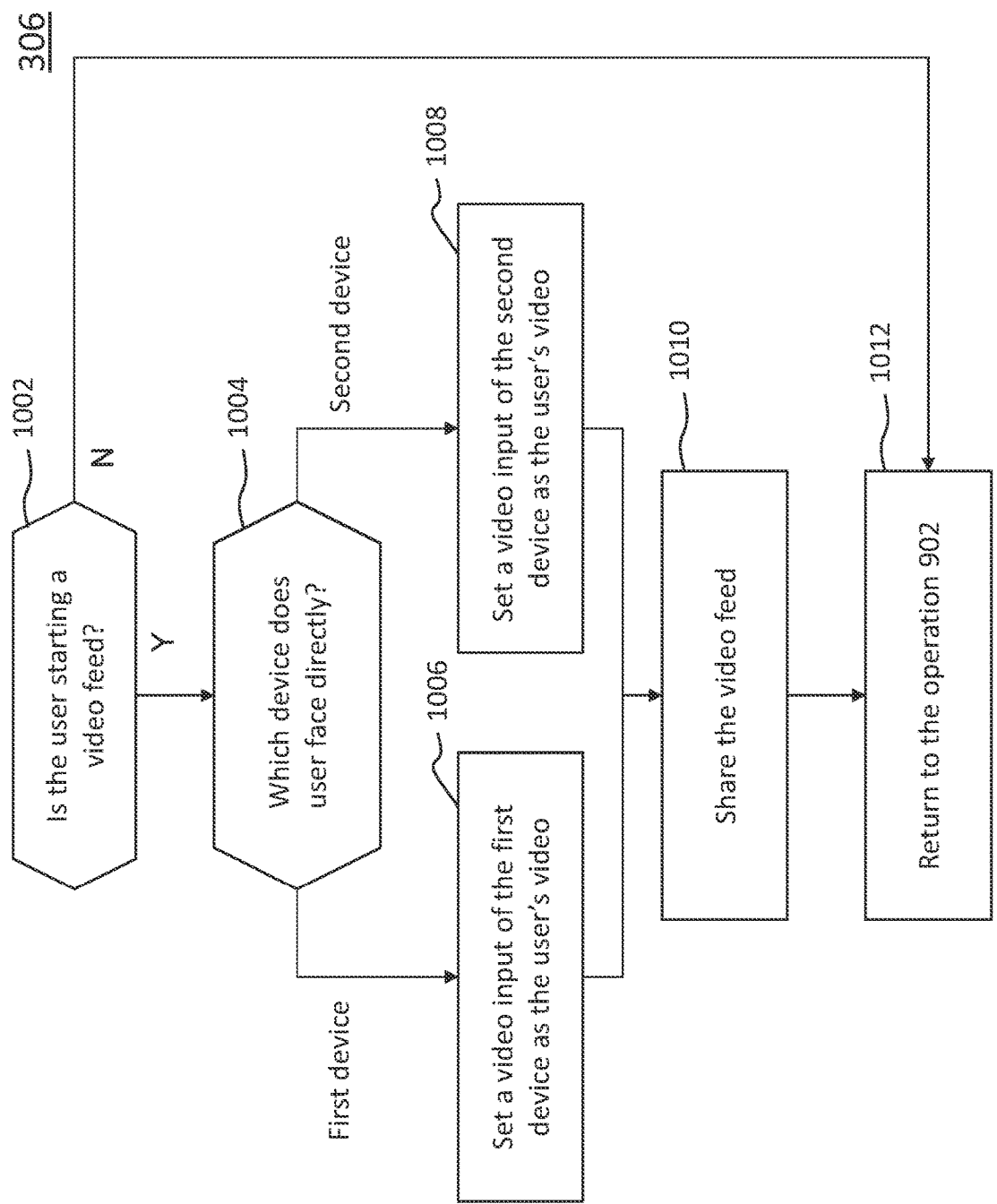
FIG. 10 illustrates an example of operation 306 of FIG. 3 in an embodiment of the present disclosure.

FIG. 10 illustrates an example of the operation 306 of FIG. 3 in an embodiment of the present disclosure. In some embodiments, operations described in FIG. 10 assume that operations described in FIG. 9 were performed in operation 304. By performing the operations described in FIG. 10, the conference server 130 determines the appropriate video feed from the first video input and the second video input. In some embodiments, the conference server 130 may perform operations described in FIG. 10 simultaneously with the operations described in FIG. 5, FIG. 6, and FIG. 8.

At operation 1002, it is determined whether the user is starting a video feed. In an example, the conference server 130 determines whether the user 140 is starting user 140's video feed to the conference server 130. Although this operation is optional, a determination of the device feeding the video or audio feed may be desired in the system's internal processing. If user 140 has not started the video, the operation may proceed to operation 1012 and the operation returns to operation 902 for re-execution of the entire step 304.

At operation 1004, it is determined which device the user faces more directly. In an example, the conference server 130 determines which device the user 140 faces more directly based on the line of sight calculated at operation 906. According to the example shown in FIG. 1, the user 140 is directly facing the first device 110 and its angle of the line of sight should be close to 90 degrees, while even if the user 140's face is captured in the AV input device 122 of the second device 120, its angle of the line of sight would be closer to 180 degrees than 90 degrees. In such a case it would be optimal or appropriate to use the image of the AV input device 112 of the first device 110 or the image of the screen 114 as the video feed.

At operation 1006 and 1008, the appropriate video input is set as the user's video. For example, if it is determined in operation 1004 that the user faces the first device more directly, then the video input from the first device is set as the user's video in operation 1006. If it is determined in operation 1004 that the user faces the second device more directly, then the video input from the second device is set as the user's video in operation 1008. In an example, the conference server 130 sets the video input of the device for which a more direct facing line of sight is detected, in either operation 1006 or operation 1008 as appropriate, to the video feed.

At operation 1010, the set video feed is shared. In an example, the conference server 130 shares the video feed set at operation 1006 or operation 1008.

At operation 1012, the operation returns to operation 902 for re-execution of the entire step 304. In this way, the video feed can be set to the camera or display screen on which the user 140 is most likely to be focusing.

Examples of Other System Configurations

The above-explained embodiments describe modifying the conference session settings using the AV input device 112 of the first device 110 and the AV input device 122 of the second device 120. In some embodiments, other system configurations can modify the conference session settings.

In some embodiments, a single device may have multiple input devices. For example, a single device may include both the AV input device 112 and the AV input device 122 for the purpose of inputting AV input to the conference server 130. In other words, the AV input device 112 and the AV input device 122 may both be implemented in one of the first device 110, the second device 120, or other devices. In some embodiments, the conference server 130 performs operation 304 in FIG. 3, or the series of operations in FIG. 4, 7, or 9 based on the first input and the second input from the AV input device 112 and the AV input device 122 implemented on a single device. The conference server 130 then may modify the audio and/or video feed that the device transmits to the conference session based on the results of the operations.

In some embodiments, the conference server 130 may modify the conference session settings based on three or more AV inputs. As mentioned above, the three or more AV inputs may each be input via an AV input device on a different device, or the three or more AV inputs may be input via multiple AV input devices implemented on a single device.

Components of the System

Figure 11:
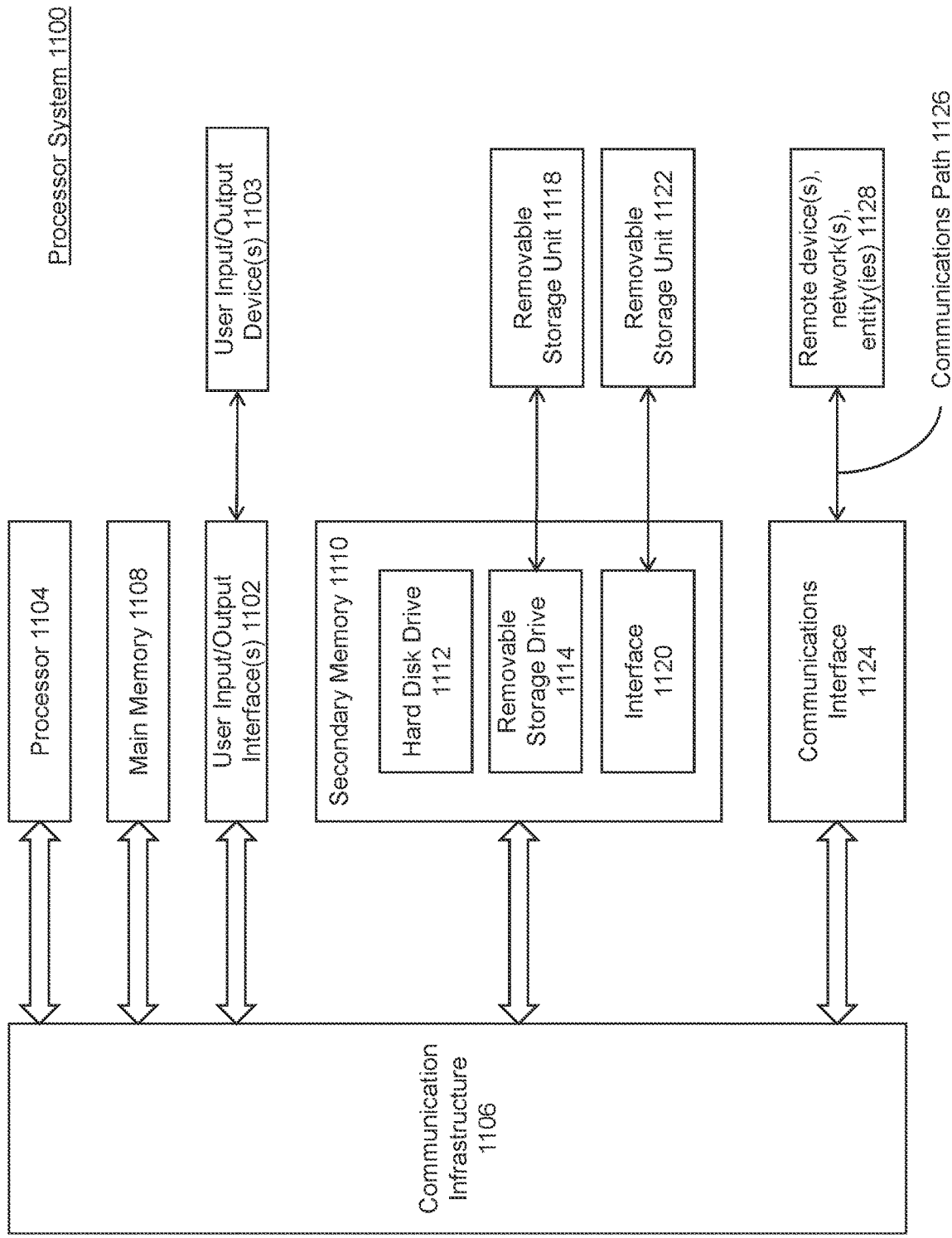
FIG. 11 illustrates an example architecture of components implementing a processor system in an embodiment of the present disclosure.

Various aspects of the above disclosure can be implemented, for example, using one or more processor systems, such as processor system 1100 shown in FIG. 11. Processor system 1100 can be any well-known computer capable of performing the functions described herein such as the first device 110, the second device 120, or the conference server 130 of FIG. 1. Processor system 1100 includes one or more processors (also called central processing units, or CPUs), such as a processor 1104. Processor 1104 is connected to a communication infrastructure 1106 (e.g., a bus.) Processor system 1100 also includes user input/output device(s) 1103, such as monitors, keyboards, pointing devices, etc., that communicate with communication infrastructure 1106 through user input/output interface(s) 1102. Processor system 1100 also includes a main or primary memory 1108, such as random access memory (RAM). Main memory 1108 may include one or more levels of cache. Main memory 1108 has stored therein control logic (e.g., computer software) and/or data.

Processor system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some aspects, secondary memory 1110 may include other means, instrumentalities or other approaches for allowing computer programs and/or other instructions and/or data to be accessed by processor system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Processor system 1100 may further include communication or network interface 1124. Communication interface 1124 enables processor system 1100 to communicate and interact with any combination of remote devices, remote networks, remote entities, etc. (individually and collectively referenced by reference number 1128). For example, communication interface 1124 may allow processor system 1100 to communicate with remote devices 1128 over communications path 1126, which may be wired and/or wireless, and may include any combination of LANs, WANs, the Internet, etc. Control logic and/or data may be transmitted to and from processor system 1100 via communication path 1126.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, processor system 1100, main memory 1108, secondary memory 1110 and removable storage units 1118 and 1122, as well as tangible articles of manufacture embodying any combination of the foregoing. Such control logic, when executed by one or more data processing devices (such as processor system 1100), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 11. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for a conference system, the computer-implemented method comprising:
   assigning, with a same user, a first device and a second device participating in a conference session;
   comparing a first input from the first device and a second input from the second device; and
   modifying a setting of the conference session based on a result of the comparison of the first input and the second input, wherein:
   the first input is a first video input from the first device and the second input is a second video input from the second device;
   comparing the first input from the first device and the second input from the second device comprises comparing a first image captured from the first video input with a second image captured from the second video input to determine a depth of an object in the first image and the second image; and
   modifying a setting of the conference session based on a result of the comparison of the first input and the second input comprises applying a background image processing to the object to at least one of the first video input and the second video input based on the depth of the object.

2. The computer-implemented method of claim 1, wherein:
   the first input further comprises a first audio input from the first device and the second input further comprises a second audio input from the second device.

3. The computer-implemented method of claim 2, wherein:
   comparing the first input from the first device and the second input from the second device further comprises comparing a first time when a sound is detected on the first device with a second time when the sound is detected on the second device; and modifying a setting of the conference session based on a result of the comparison of the first input and the second input further comprises removing the sound from the first audio input where the first time is later than the second time.

4. The computer-implemented method of claim 2, wherein:
comparing the first input from the first device and the second input from the second device further comprises comparing a first time when a sound is detected on the first device with a second time when the sound is detected on the second device; and
modifying a setting of the conference session based on a result of the comparison of the first input and the second input further comprises setting a video input of the first device as the user's video input where the first time is earlier than the second time.

5. The computer-implemented method of claim 2, wherein:
comparing the first input from the first device and the second input from the second device further comprises comparing a first time when a sound is detected on the first device with a second time when the sound is detected on the second device to determine a location of the sound's source; and
modifying a setting of the conference session based on a result of the comparison of the first input and the second input further comprises removing the sound from one of the first device and the second device based on the location of the sound's source.

6. The computer-implemented method of claim 1, wherein:
comparing the first input from the first device and the second input from the second device further comprises comparing a first direction of the user's line of sight in the first video input and a second direction of the user's line of sight in the second video input; and
modifying a setting of the conference session based on a result of the comparison of the first input and the second input further comprises setting a video input of the first device as the user's video input when the user is determined to be more directly facing the first device based on the first direction and the second direction.

7. The computer-implemented method of claim 1, wherein:
the assigning, with the same user, the first device and the second device participating in the conference session comprises assigning, with the same user, the first device and the second device participating in the conference session after detecting that the first device and the second device are used to log in to the conference session using a same user ID.

8. A system, comprising:
a memory configured to store operations; and
one or more processors configured to perform the operations, the operations comprising:
assigning, with a same user, a first device and a second device participating in a conference session;
comparing a first input from the first device and a second input from the second device; and
modifying a setting of the conference session based on a result of the comparison of the first input and the second input, wherein
the first input is a first video input from the first device and the second input is a second video input from the second device;

comparing the first input from the first device and the second input from the second device comprises comparing a first direction of the user's line of sight in the first video input and a second direction of the user's line of sight in the second video input; and
modifying a setting of the conference session based on a result of the comparison of the first input and the second input comprises setting a video input of the first device as the user's video input when the user is determined to be more directly facing the first device based on the first direction and the second direction.

9. The system of claim 8, wherein:
the first input further comprises a first audio input from the first device and the second input further comprises a second audio input from the second device.

10. The system of claim 9, wherein:
comparing the first input from the first device and the second input from the second device further comprises comparing a first time when a sound is detected on the first device with a second time when the sound is detected on the second device; and
modifying a setting of the conference session based on a result of the comparison of the first input and the second input further comprises removing the sound from the first audio input where the first time is later than the second time.

11. The system of claim 9, wherein:
comparing the first input from the first device and the second input from the second device further comprises comparing a first time when a sound is detected on the first device with a second time when the sound is detected on the second device; and
modifying a setting of the conference session based on a result of the comparison of the first input and the second input further comprises setting a video input of the first device as the user's video input where the first time is earlier than the second time.

12. The system of claim 9, wherein:
comparing the first input from the first device and the second input from the second device further comprises comparing a first time when a sound is detected on the first device with a second time when the sound is detected on the second device to determine a location of the sound's source; and
modifying a setting of the conference session based on a result of the comparison of the first input and the second input further comprises removing the sound based on the location of the sound's source.

13. The system of claim 8, wherein:
comparing the first input from the first device and the second input from the second device further comprises comparing a first image captured from the first video input with a second image captured from the second video input to determine a depth of an object in the first image and the second image; and
modifying a setting of the conference session based on a result of the comparison of the first input and the second input further comprises applying a background image processing to the object to at least one of the first video input and the second video input based on the depth of the object.

14. The system of claim 8, wherein:
the assigning, with the same user, the first device and the second device participating in the conference session comprises assigning, with the same user, the first device and the second device participating in the conference session after detecting that the first device and the second device are used to log in to the conference session using a same user ID.

15. A computer readable storage device having instructions stored thereon that, when executed by one or more processing devices, cause the one or more processing devices to perform operations comprising:
assigning, with a same user, a first device and a second device participating in a conference session;
comparing a first input from the first device and a second input from the second device; and
modifying a setting of the conference session based on a result of the comparison of the first input and the second input, wherein:
the first input is a first video input from the first device and the second input is a second video input from the second device;
comparing the first input from the first device and the second input from the second device comprises comparing a first image captured from the first video input with a second image captured from the second video input to determine a depth of an object in the first image and the second image; and
modifying a setting of the conference session based on a result of the comparison of the first input and the second input comprises applying a background image processing to the object to at least one of the first video input and the second video input based on the depth of the object.

16. The computer readable storage device of claim 15, wherein:
the first input further comprises a first audio input from the first device and the second input is a second audio input from the second device.

17. The computer readable storage device of claim 16, wherein:
comparing the first input from the first device and the second input from the second device further comprises comparing a first time when a sound is detected on the first device with a second time when the sound is detected on the second device; and
modifying a setting of the conference session based on a result of the comparison of the first input and the second input further comprises removing the sound from the first audio input where the first time is later than the second time.

18. The computer readable storage device of claim 16, wherein:
comparing the first input from the first device and the second input from the second device further comprises comparing a first time when a sound is detected on the first device with a second time when the sound is detected on the second device; and
modifying a setting of the conference session based on a result of the comparison of the first input and the second input further comprises setting a video input of the first device as the user's video input where the first time is earlier than the second time.

19. The computer readable storage device of claim 16, wherein:
comparing the first input from the first device and the second input from the second device further comprises comparing a first time when a sound is detected on the first device with a second time when the sound is detected on the second device to determine a location of the sound's source; and
modifying a setting of the conference session based on a result of the comparison of the first input and the second input further comprises removing the sound from one of the first device and the second device based on the location of the sound's source.

20. The computer readable storage device of claim 15, wherein:
comparing the first input from the first device and the second input from the second device further comprises comparing a first direction of the user's line of sight in the first video input and a second direction of the user's line of sight in the second video input; and
modifying a setting of the conference session based on a result of the comparison of the first input and the second input further comprises setting a video input of the first device as the user's video input when the user is determined to be more directly facing the first device based on the first direction and the second direction.

* * * * *